(12) United States Patent
Su

(10) Patent No.: US 7,292,971 B2
(45) Date of Patent: Nov. 6, 2007

(54) LANGUAGE PHONETIC SYSTEM AND METHOD THEREOF

(76) Inventor: Kuojui Su, 13936 Wyandotte St., Van Nuys, CA (US) 91405

( * ) Notice: Subject to any disclaimer, the term of this patent is extended or adjusted under 35 U.S.C. 154(b) by 366 days.

(21) Appl. No.: 10/871,312

(22) Filed: Jun. 18, 2004

(65) Prior Publication Data

US 2005/0102132 A1  May 12, 2005

(30) Foreign Application Priority Data

Oct. 27, 2003  (TW) .............................. 92129707 A

(51) Int. Cl.
  *G06F 17/28*  (2006.01)
(52) U.S. Cl. ............................ 704/5; 434/167; 434/178
(58) Field of Classification Search .................... 704/5; 434/167, 178
  See application file for complete search history.

(56) References Cited

U.S. PATENT DOCUMENTS 4,030,211 A * 6/1977 McGinley .................... 434/167
6,126,447 A * 10/2000 Engelbrite ................... 434/167
6,810,374 B2 * 10/2004 Kang ............................ 704/2
6,824,388 B2 * 11/2004 Goodfriend ................. 434/178
2004/0167769 A1 * 8/2004 Becker ........................... 704/3
2005/0102143 A1 * 5/2005 Woodward ................... 704/254

FOREIGN PATENT DOCUMENTS

CN    1455358 A  * 11/2003

* cited by examiner

*Primary Examiner*—David Hudspeth
*Assistant Examiner*—Eunice Ng
(74) *Attorney, Agent, or Firm*—Raymond Y. Chan; David and Raymond Patent Group

(57) ABSTRACT

A phonetic system having vowel phonetic symbols separated into full sound symbols and half sound symbols, and consonant phonetic symbols. The full sounds symbols are represented by letters in the English alphabet. The half sound symbols are represented by letters in the English alphabet with a predetermined symbol. Most consonant phonetic symbols are taken from consonant letters of English vocabularies. A phonetic diagram where the vowel phonetic symbols and the consonant phonetic symbols are systematically arranged therein is provided to allow user to easily visualize the vowel and consonant phonetic symbols. The phonetics utilizes direct phonetic spelling method, so as to enable easier obtaining of correct pronunciation. It also helps avoiding the possibility of misreading by utilizing combination of letters that do not appear in the English language.

6 Claims, No Drawings

LANGUAGE PHONETIC SYSTEM AND METHOD THEREOF

BACKGROUND OF THE PRESENT INVENTION

1. Field of Invention

The present invention relates to a learning tool, and more particularly to the utilization of accustomed English letters as phonetic symbols for pronunciation of the Chinese characters.

2. Description of Related Arts

The Chinese Language phonetics of the present invention is a phonetics that utilizes letters in the English alphabet as their phonetic symbols for pronunciation of the Chinese characters. The above mentioned Chinese Language is equivalent to the Guoyu (national language) in Taiwan, R.O.C. and the Putonghua (general language) in the Mainland China, P.R.C. At present, the Taiwanese utilizes the Guoyu Zhuyin symbols and the Mainland Chinese utilizes the Chinese Pinyin as phonetic symbols for learning the Chinese language. People in other countries tend to utilize the Chinese Pinyin, which symbols use the letters in English alphabet, for much easier learning.

However, rules of Chinese Pinyin are difficult to understand, since Chinese Pinyin has two characteristics, the first being pronunciations of Chinese Pinyin symbols are linked to that of Latin and the second being Chinese Pinyin utilizes phonetic spelling logics of Guoyu Zhuyin symbols, such that people with an English background but have no knowledge of Guoyu Zhuyin symbols find it difficult to adapt. An example is that the Chinese character "衣" (translated as "clothes") is represented by "i" in Chinese Pinyin. However, people with an English background is accustomed to pronouncing a single "i" as the Chinese character "埃" (translated as "dust") or a short sound that is similar to the sound of the Chinese character "衣" but not the same long sound of the word "衣." The reason is that there are certain rules as to how vowels in English vocabularies are pronounced. As a result, the linkage between Chinese Pinyin and Latin pronunciations creates the situation of learners having an English background cannot get used to the Chinese Pinyin. Also, Chinese Pinyin phonetically spell the word "天" as "tian" (ㄊ一ㄢ) but not the direct phonetic spelling of "tien", this is the result of the utilization of phonetic spelling logics of Guoyu Zhuyin with Chinese Pinyin causing confusions to learners without any knowledge of Guoyu Zhuyin.

To improve the above situations, the Chinese Phonetic symbols has to be linked with the English language, such as the Chinese character "梯" (translated as "ladder") should be pronounced as "tee" to replace the pronunciation of "ti" in Chinese Pinyin, which is more suitable for learners with an English background. As a result, with the above settings of Chinese Language phonetics, which is a linkage with English, the entire population of Chinese learners with English background can accept easier when learning the Chinese Language. The above reasons are the reasons for the present invention of Chinese Language Phonetics.

SUMMARY OF THE PRESENT INVENTION

A main object of the present invention is to provide a phonetic system for people with English background to easier learn Chinese. In which, the vowels in this Chinese language phonetics are classified into full sounds and half sounds, represented by full sound symbols and half sound symbols respectively, wherein the full sounds are capable of representing the pronunciations of complete syllables, therefore named full sounds.

Full sound symbols are obtained from vowels of long sound of English vocabularies. Half sounds represent pronunciations for incomplete syllables, therefore named half sounds. Half sound symbols are obtained from vowels of short sound of English vocabularies. As a result, this Chinese language phonetics has the characteristic of a real linkage with vowels of the English language. Apart from the above, this Chinese phonetics comprises the following enabling rules:

1. It utilizes direct phonetic spelling method, such as the Chinese characters "天糾" (translated as "sky" and "criticize") are phonetically spelt as "tien jio" in this phonetics, which is more direct than the "tian jiu" of the Mainland Chinese Pinyin, for an easier obtaining of correct pronunciation.

2. The design considered the compatibility with Chinese Pinyin, as a result, learners of this phonetics will find it easier to adapt to, if due to any reasons, when they have to utilize Chinese Pinyin. Similarly, Chinese Pinyin users will find this phonetics easy to adapt to.

3. To avoid the possibility of misreading, such as ㄓ, ㄔand ㄕof Guoyu Zhuyin symbols are represented by combinations of letters that do not appear in the English language, "tz''", "tc''" and "s''" respectively, so as to avoid situations similar to confusing the pronunciation of Chinese Pinyin symbols "zh", "ch" and "sh" with their respective usage in the English Language.

Accordingly, in order to accomplish the above objects, the present invention provides a phonetic system for English-speaking Chinese-language learners, wherein said phonetic system comprising:

a plurality of vowel phonetic symbols including a plurality of full sound symbols, wherein each of the full sound symbols represents a specific complete syllable pronunciations, and a plurality of half sound symbols, wherein each of the half sound symbol represents a specific incomplete syllable pronunciation;

a plurality of consonant phonetic symbols wherein each of the consonant phonetic symbols represents a specific consonant sound; and a phonetic diagram provided to facilitate human visualizing, wherein the vowel phonetic symbols and the consonant phonetic symbols are systematically arranged therein.

The present invention also provides a method of providing a phonetic system, comprising the steps of:

(a) providing a plurality of vowel phonetic symbols, wherein each of the plurality of vowel phonetic symbols represents a predetermined vowel sound;

(b) providing a plurality of consonant phonetic symbols, wherein each of the plurality of consonant phonetic symbols represents a predetermined consonant sound; and (c) systematically arranging the plurality of vowel phonetic symbols and the plurality of consonant phonetic symbols into a phonetic diagram, allowing a learner to have a systematic understanding of the vowel phonetic symbols and the consonant phonetic symbols.

These and other objectives, features, and advantages of the present invention will become apparent from the following detailed description, the accompanying drawings, and the appended claims.

DETAILED DESCRIPTION OF THE PREFERRED EMBODIMENT

Vowel phonetic symbols are divided into full sound symbols and half sound symbols, as a result, the present phonetic symbols and their pronunciations are suitable for analogously obtained from the vowel letters of vowel sounds of long sounds or short sounds of English vocabularies, such that they can be easily accepted by people with an English background. For example, a symbol of this Chinese phonetic symbol represented by "oo", which sound is the same as that of the Chinese character "烏" (translated as "dark"), has the same sound as the "oo" in the word "food". The symbol "oo" can not only represent the correct pronunciation of the word "烏", but also easy to learn. Below is an instruction of the classification of full sounds and half sounds of the present invention illustrating the phonetic symbols and their basis of usage:

"âî", "în" and "îê" can be used for phonetically spelling the syllables âî(埃)", "bîn(兵)" and "jîê(接)" respectively.

However, there are a few exception Chinese characters, representing exclamation, such as "譁" (translated as "stunned") (ə̂) and "噢" (translated as "oh") (ô), which have pronunciations of half sound syllables.

The systematic characteristics of Conventional Chinese vowel phonetic symbols are not very obvious. As a result, it is relatively difficult to obtain a complete concept during learning. The present classification of full sound and half sound of the Chinese phonetic symbols is suitable for producing a simple phonetic symbol list, providing convenience in analysis and learning, as a result, a method of combining phonetic symbols is invented. In order to provide a simple symbol list, the design is a circle, wherein on an outer periphery of the circle comprises five full sound symbols, namely, "a", "ee", "oo", "ae", and "o" and their

| Symbols of the Present Chinese Phonetics | Corresponding Guoyu Zhuyin Symbol | Basis of the Usage of the Phonetic Symbols | Application Example | Guoyu Zhuyin Symbol |
|---|---|---|---|---|
| Full Sound | | | | |
| a | ㄚ | The "a" sound in the word "father". | ta (他) | ㄊㄚ |
| ae | ㄟ | A custom of the English language, wherein the pronunciation of the vowel followed by an "e" is a long vowel sound. | fae (飛) | ㄈㄟ |
| ee | ㄧ | The "ee" sound in the word "need". | tee (梯) | ㄊㄧ |
| o | ㄡ | The "o" sound in the word "go". | to (偷) | ㄊㄡ |
| oo | ㄨ | The "oo" sound in the word "too". | doo (都) | ㄉㄨ |
| ii | ㄩ | Predetermined | jii (局) | ㄐㄩ |
| ə | ㄜ | Obtained from the "schwa" symbol from the English phonetic symbols. | kə (顆) | ㄎㄜ |
| Half Sound | | | | |
| â | Short pronunciation of "ㄚ" | The "a" sound of the word "car". | ân (安) | ㄢ |
| ê | Latter half sound of "ㄝ" | The "e" sound of the word "set". | tîê (貼) | ㄊㄧㄝ |
| î | Short pronunciation of "ㄧ" | The "i" sound of the word "kid". | bîn (兵) | ㄅㄧㄥ |
| ô | Short pronunciation of "ㄛ" | The "o" sound of the word "lore". | sûô (梭) | ㄙㄨㄛ |
| û | Short pronunciation of "ㄨ" | The "u" sound of the word "push". | tûn (吞) | ㄊㄨㄣ |
| îi | Short pronunciation of "ㄩ" | Predetermined. | jîn (君) | ㄐㄩㄣ |
| ə̂ | Short pronunciation of "ㄜ" | Obtained from the "schwa" symbol from the English phonetic symbols. | ə̂n (恩) | ㄣ |

The phonetic spelling method according to the above lists is such that full sound symbol can be used alone to represent pronunciations of syllables, for example, full sound symbol "o" alone can represent the sound of a syllable of the Chinese character "歐(o)" (translated as "Europe"), or used alone to represent the vowel sound of the syllable "剖(po)" (translated as "to cut open"). In phonetic spelling, half sound symbols alone cannot represent a pronunciation of a syllable, but can form combined symbols which can perform the equivalent role of full sound symbols. As an example, combined symbols comprising the half sound symbol "î", corresponding five half sound symbols, namely, "â", "ê", "û", "ê", and "ô". This method of classifying vowels into 5 groups is also utilized by the English Language. It is relatively more systematic, which helps learners to understand the structure of the language. Apart from the symbols on the outer periphery of the circle, inside the circle are special sounds in the Chinese language, namely ii, îi and the neutral sound ə and ə̂. Apart from being able to provide analysis, this list also has the advantage of easy to memorize:

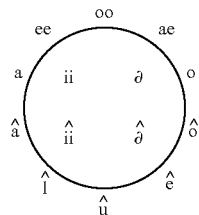

Most consonant in Chinese phonetics are similar to consonants of the English language, as a result, the consonant phonetic symbols of the present Chinese phonetics are taken from consonant letters of English vocabularies. A few Chinese-language-only phonetic are specially defined. Below is a list of consonant phonetic symbols of the present Chinese phonetics and their basis of usage:

| Consonant Symbols of the Present Chinese Phonetics | Corresponding Guoyu Zhuyin Symbol | Basis of the Usage of the Phonetic Symbols | Application Example | Guoyu Zhuyin Symbol |
|---|---|---|---|---|
| b | ㄅ | The letter "b" in the word "boy" | bân (班) | ㄅㄢ |
| p | ㄆ | The letter "p" in the word "pay" | pee (批) | ㄆㄧ |
| m | ㄇ | The letter "m" in the word "may" | mûô (摸) | ㄇㄛ |
| f | ㄈ | The letter "f" in the word "fan" | fâng (方) | ㄈㄤ |
| d | ㄉ | The letter "d" in the word "day" | dôông (燈) | ㄉㄥ |
| t | ㄊ | The letter "t" in the word "toy" | tee (梯) | ㄊㄧ |
| n | ㄋ | The letter "n" in the word "no" | nûô (挪) | ㄋㄨㄛ |
| l | ㄌ | The letter "l" in the word "long" | la (拉) | ㄌㄚ |
| g | ㄍ | The letter "g" in the word "go" | go (勾) | ㄍㄡ |
| k | ㄎ | The letter "k" in the word "kind" | kong (空) | ㄎㄨㄥ |
| h | ㄏ | The letter "h" in the word "hide" | hûâ (花) | ㄏㄨㄚ |
| j (i) | ㄐ | The letter "j" in the word "jeep" | jee (基) | ㄐㄧ |
| | | | jîn (巾) | ㄐㄧㄣ |
| | | | jii (居) | ㄐㄩ |
| | | | jîîn (軍) | ㄐㄩㄣ |
| q (i) | ㄑ | Specially defined | qee (漆) | ㄑㄧ |
| | | | qîê (切) | ㄑㄧㄝ |
| | | | qii (曲) | ㄑㄩ |
| | | | qîîê (缺) | ㄑㄩㄝ |
| x (i) | ㄒ | Specially defined | xee (西) | ㄒㄧ |
| | | | xîâ (蝦) | ㄒㄧㄚ |
| | | | xii (需) | ㄒㄩ |
| | | | xîîê (削) | ㄒㄩㄝ |
| tz" | ㄓ | Specially defined | tz" a (紫) | ㄓㄚ |
| tc" | ㄔ | Specially defined | tc" a (叉) | ㄔㄚ |
| s" | ㄕ | Specially defined | s" a (沙) | ㄕㄚ |
| rr | ㄖ | Specially defined | rrâng (嚷) | ㄖㄤ |
| tz | ㄗ | Specially defined | tz. (資) | ㄗ |
| tc | ㄘ | Specially defined | tcâ (擦) | ㄘㄚ |
| s | ㄙ | The letter "s" in the word "same" | sa (撒) | ㄙㄚ |
| y | ㄧ | The letter "y" in the word "yeast" | ya (鴨) | ㄧㄚ |
| | | | yo (優) | ㄧㄡ |
| | | | yee (衣) | ㄧ |
| | | | yîê (耶) | ㄧㄝ |

-continued

| Consonant Symbols of the Present Chinese Phonetics | Corresponding Guoyu Zhuyin Symbol | Basis of the Usage of the Phonetic Symbols | Application Example | Guoyu Zhuyin Symbol |
|---|---|---|---|---|
| W | ㄨ | The letter "w" in the word "wide" | wa (挖) | ㄨㄚ |
| yii | ㄩ | Specially defined | yii (迂) | ㄩ |
|  |  |  | yiiên (淵) | ㄩㄢ |

Below is the application instructions and application example of the Chinese phonetics:

Vowel sounds of Chinese phonetics are divided into full sounds and half sounds, not only can this provide a better linking effect to the English language, it is also suitable for analyzing the phonetics of the Chinese language. However, when applying to phonetically spelling, for simplifying purposes, the marking of the addition symbol "^" of the half sound symbols can be omitted. The majority of the simplified phonetic combinations do not affect the results of the phonetic spelling. The only exception is that when the additional symbol, "^", of the half sound symbol "ô" is omitted, it is impossible to distinguish in phonetic combinations whether it is a full sound of a half sound, which may affect its correct pronunciation. To avoid confusion, it can be distinguished from a simple method. When the symbols of a syllable includes "uo" or "ao", "o" acts as a half sound, for example, "suo" ("梭" translated as "shuttle", "ㄙㄨㄛ"), "gao" ("高" translated as "tall", "ㄍㄠ"). Apart from those two, other combinations of "o" act as full sounds, for example, "so" ("搜" translated as "search", "ㄙㄡ"), "xîo" ("休" translated as "rest", "ㄒㄧㄡ"), dîo ("丟" translated as "throw", "ㄉㄧㄡ"), "song" ("松" translated as "pine", "ㄙㄨㄥ"), and "fong" ("風" translated as "wind", "ㄈㄥ"). "o" of full sounds is similar to the "ㄡ" sound of Guoyu Zhuyin, wherein the ending of the pronunciation includes a slight "u (烏)" sound. "o" of half sounds is similar to the "ㄛ" sound of Guoyu Zhuyin, which does not have the ending sound of "烏(u)".

Consonant symbols "tz'"", "tc'"", "s'"", "rr", "tz", "tc" and "s" of this phonetics are similar to consonant symbols "ㄓ", "ㄔ", "ㄕ", "ㄖ", "ㄗ", "ㄘ" and "ㄙ" of Guoyu Zhuyin symbols respectively, wherein the difference in application is that the above listed Guoyu Zhuyin symbols alone can represent the pronunciations of syllables, such as "ㄓ" represents the pronunciation of "之" (translated as "of") and "ㄔ" represents the pronunciation of "吃" (translated as "eat"), whereas as consonant symbols of this Chinese phonetics, when used alone, "tz'"", "tc'"", "s'"", "rr", "tz", "tc" and "s" are easily considered as sounds of their English letters. As a result, the above mentioned consonant symbols of this Chinese phonetics utilize the "period", ". ", to distinguish, by marking the lower right hand corner of the symbols, such as "tz". " to represent the pronunciation of "之", "tc". " to represent the pronunciation of "吃", and "s". " to represent the pronunciation of 詩(translated as "poem").

Vowel phonetic symbols "î", "ee", "îi", "ii", "û", and "oo" are not to be used on the first symbol of the phonetic marking, instead, they should be matched with consonant sounds "y" or "w" of the same series to provide unity in application, such as "yîn" ("音" translated as "sound"), "yee" (衣 translated as "clothing"), "yîîê" (迂 translated as "curve"), "wûô" (窩 translated as "cave"), and "woo" (烏 translated as "dark").

Intonation symbol utilizes method similar to that of Guoyu Zhuyin: first tone utilizes "" or no markings; second tone utilizes " ́ "; third tone utilizes ""; fourth tone utilizes ""; soft sound utilizes "". Marking positions of intonation symbols are above the last letter of each syllable, such that when phonetically spelling a phrase, the intonation symbols can act as a boundary between syllables, such as "jingaì" ("敬愛" translated as "respectably love") is a combination of the two syllables "jing̀" "aì".

Below are actual application examples, which are according to and in the order of the Guoyu Zhuyin symbols ㄅ, ㄆ, ㄇ, and ㄈ including the three phonetic spelling of this Chinese phonetics, Guoyu Zhuyin symbols and the Chinese Pinyin for comparison, so as to show the advantages of the present phonetics:

| Order of Guoyu Zhuyin Symbol | Chinese character and Its Guoyu Zhuyin | Phonetic Spelling of the Present Chinese Phonetics. The Phonetic Spelling in Brackets are the Spelling Maintaining the Additional Symbol "^" | Phonetic Spelling of Mainland Chinese Pinyin |
|---|---|---|---|
| ㄅ | 巴(ㄅㄚ) | ba | ba |
|  | 邊(ㄅㄧㄢ) | bien (bîên) | bian |
|  | 玻(ㄅㄛ) | buo (bûô) | bo |
| ㄆ | 拍(ㄆㄞ) | pai (pâî) | pai |
|  | 坡(ㄆㄛ) | puo (pûô) | po |
| ㄇ | 媽(ㄇㄚ) | ma | ma |
|  | 摸(ㄇㄛ) | muo (mûô) | mo |
| ㄈ | 發(ㄈㄚ) | fa | Fa |
|  | 佛(ㄈㄛ) | fuo (fûô) | fo |
|  | 否(ㄈㄡ) | fo | fou |
| ㄉ | 搭(ㄉㄚ) | da | da |
|  | 兜(ㄉㄡ) | do | dou |
|  | 多(ㄉㄛ) | duo (dûô) | duo |
|  | 爹(ㄉㄧㄝ) | die (dîê) | die |
| ㄊ | 他(ㄊㄚ) | ta | ta |
|  | 吞(ㄊㄨㄣ) | tun (tûn) | tun |
|  | 偷(ㄊㄡ) | to | tou |
| ㄋ | 虐(ㄋㄩㄝ) | niie (nîîê) | nue |
|  | 挪(ㄋㄨㄛ) | nuo (nûô) | nuo |

-continued

| Order of Guoyu Zhuyin Symbol | Chinese character and Its Guoyu Zhuyin | Phonetic Spelling of the Present Chinese Phonetics. The Phonetic Spelling in Brackets are the Spelling Maintaining the Additional Symbol "ˆ" | Phonetic Spelling of Mainland Chinese Pinyin |
|---|---|---|---|
| ㄌ | 拉(ㄌㄚ) | la | la |
|   | 溜(ㄌㄧㄡ) | lio (lîo) | liu |
| ㄍ | 哥(ㄍㄜ) | gô | Ge |
|   | 勾(ㄍㄡ) | go | gou |
| ㄎ | 咖(ㄎㄚ) | ka | ka |
|   | 盔(ㄎㄨㄟ) | kuae (kûae) | kui |
| ㄏ | 哈(ㄏㄚ) | ha | ha |
|   | 花(ㄏㄨㄚ) | hua (hûâ) | hua |
| ㄐ | 基(ㄐㄧ) | jee | Ji |
|   | 巾(ㄐㄧㄣ) | jin (jîn) | jin |
|   | 居(ㄐㄩ) | jii | ju |
|   | 軍(ㄐㄩㄣ) | jiin (jîin) | jun |
| ㄑ | 漆(ㄑㄧ) | qee | qi |
|   | 切(ㄑㄧㄝ) | qie (qîê) | qie |
|   | 曲(ㄑㄩ) | qii | qu |
|   | 缺(ㄑㄩㄝ) | qiie (qîîê) | que |
| ㄒ | 西(ㄒㄧ) | xee | xi |
|   | 蝦(ㄒㄧㄚ) | xia (xîâ) | xu |
|   | 削(ㄒㄩㄝ) | xiie (xîîê) | xue |
| ㄓ | 之(ㄓ) | tz". | zhi |
|   | 紮(ㄓㄚ) | tz" a | zha |
|   | 針(ㄓㄣ) | tz" ∂n (tz" ∂̂n) | zhen |
|   | 征(ㄓㄥ) | tz" ∂ng (tz" ∂̂ng) | zheng |
| ㄔ | 吃(ㄔ) | tc". | chi |
|   | 叉(ㄔㄚ) | tc" a | cha |
|   | 稱(ㄔㄥ) | tc" ∂ng (tc" ∂̂ng) | cheng |
|   | 瞋(ㄔㄣ) | tc" ∂n (tc" ∂̂n) | chen |
| ㄕ | 詩(ㄕ) | s". | shi |
|   | 沙(ㄕㄚ) | s" a | sha |
|   | 聲(ㄕㄥ) | s" ∂ng (s" ∂̂ng) | sheng |
|   | 深(ㄕㄣ) | s" ∂n (s" ∂̂n) | shen |
| ㄖ | 日(ㄖ) | rr". | ri |
|   | 嚷(ㄖㄤ) | rrang (rrâng) | ran |
| ㄗ | 資(ㄗ) | tz. | zi |
|   | 匝(ㄗㄚ) | tza | za |
| ㄘ | 疵(ㄘ) | tc. | ci |
|   | 擦(ㄘㄚ) | tca | ca |
| ㄙ | 思(ㄙ) | s. | si |
|   | 撒(ㄙㄚ) | sa | sa |
| ㄧ | 衣(ㄧ) | yee | yi |
|   | 鴨(ㄧㄚ) | ya | ya |
|   | 耶(ㄧㄝ) | yie (yîê) | ye |
|   | 優(ㄧㄡ) | yo | yo |
|   | 音(ㄧㄣ) | yin (yîn) | yin |
|   | 聽(ㄊㄧㄥ) | ting (tîng) | ting |
|   | 丟(ㄉㄧㄡ) | dio (dîo) | diu |
| ㄨ | 都(ㄉㄨ) | doo | du |
|   | 敦(ㄉㄨㄣ) | dun (dûn) | dun |
|   | 挖(ㄨㄚ) | wa | wa |
|   | 屋(ㄨ) | woo | wu |
|   | 窩(ㄨㄛ) | wuo (wûô) | wo |
| ㄩ | 迂(ㄩ) | yii | yu |
|   | 君(ㄐㄩㄣ) | jiin (jîin) | jun |
|   | 約(ㄩㄝ) | yiie (yîîê) | yue |
|   | 淵(ㄩㄢ) | yiien (yîîên) | yuan |
| ㄚ | 他(ㄊㄚ) | ta | ta |
| ㄛ | 玻(ㄅㄛ) | buo (bûô) | bo |
|   | 梭(ㄙㄨㄛ) | suo (sûô) | suo |
|   | 噢(ㄛ) | ô | ô |
| ㄜ | 麼(ㄇㄜ) | m∂ (m∂̂) | me |
| ㄞ | 埃(ㄞ) | ai (âi) | ai |
| ㄟ | 黑(ㄏㄟ) | hae | hei |
| ㄠ | 凹(ㄠ) | ao (âô) | ao |
| ㄡ | (收)ㄕㄡ | s" o | shou |
|   | (搜)ㄙㄡ | so | sou |

These phonetics can be applied on printed material, virtual media or other medium, so as to pass this Chinese language phonetics to learners.

One skilled in the art will understand that the embodiment of the present invention as shown in the drawings and described above is exemplary only and is not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of providing a phonetic system for first-language-speaking second language learners, comprising the steps of:
    (a) providing a plurality of vowel phonetic symbols, wherein each of said vowel phonetic symbols represents a predetermined vowel sound;
    (b) providing a plurality of consonant phonetic symbols, wherein each of said consonant phonetic symbols represents a predetermined consonant sound; and
    (c) systematically arranging said plurality of vowel phonetic symbols and said plurality of consonant phonetic symbols into a phonetic diagram, for allowing the learner to have a systematic understanding of said vowel phonetic symbols and said consonant phonetic symbols;
    wherein said step (b) further comprises the sub-steps of:
    (b.1) choosing a plurality of equivalent consonant symbols from said first-language, wherein each of said equivalent consonant symbols represent an equivalent consonant sound in said second language;
    (b.2) choosing a plurality of new consonant symbols; and
    (b.3) defining each of said plurality of new consonant symbols to represent a second language consonant sound appearing only in said second-language;
    wherein said step (c) further comprises the sub-steps of:
    (c.1) systematically arranging said plurality of vowel phonetic symbols into a vowel symbol diagram; and
    (c.2) systematically arranging said plurality of consonant phonetic symbols into a consonant symbol diagram;
    (c.3) grouping said equivalent sound symbols to a first group, and grouping said new sound symbols to a second group; and
    (c.4) grouping said equivalent consonant symbols to a third group, and grouping said new consonant symbols to a fourth group.

2. A method of providing a phonetic system for Chinese language for English-speaking Chinese language learners, comprising:
    providing a set of vowel phonetic symbols including a plurality of full sound symbols, wherein each of said full sound symbols represents a predetermined complete syllable pronunciation, and a plurality of half sound symbols, wherein each of said half sound symbol represents a predetermined incomplete syllable pronunciation;
    providing a plurality of consonant phonetic symbols wherein each of said consonant phonetic symbols represents a predetermined consonant sound;
    systematically arranging said vowel phonetic symbols and said consonant phonetic symbols to facilitate human visualizing; and
    providing a plurality of combined symbols each including one of said plurality of half sound symbols followed by one of said plurality of half sound symbols or by one of said plurality of consonant phonetic symbols, wherein each of said combined symbols represents a predetermined complete syllable pronunciation;
    wherein said vowel phonetic symbols and said consonant phonetic symbols are adapted from a plurality of letters of English alphabet and predetermined symbols recognized by the English-speaking Chinese learners;
    wherein each of said full sound symbols is selectively contributed by a long sound vowel letter or a combination of vowel English letters respectively, and each of said half sound symbols is contributed from a predetermined short sound vowel English letter;
    wherein said full symbols include an "a" symbol representing an "a" sound in a word "father", an "ae" symbol representing an "ay" sound in a word "lay", an "ee" symbol representing an "ee" sound in a word "need", an "o" symbol representing an "o" sound in a word "go", an "oo" symbol representing an "oo" sound in a word "too", an "ii" symbol representing a first predetermined full vowel sound of a word "局" (translated as "set"), and a "θ" symbol representing a second predetermined full vowel sound of a word "顆" (translated (translated as "piece"), said half sound symbols comprising an "â" symbol rep resenting a shortened "a" sound of said "a" symbol, an "î" symbol representing a shortened "ee" sound of said "ee" symbol, an "û" symbol having a shortened "oo" sound of said "oo" symbol, an "ê" symbol representing an "ae" symbol front half sound, an "ô" symbol representing an "o" symbol front half sound, an "ii" symbol representing a shortened "îi" sound of said "ii" symbol, and an "θ̂" symbol representing a shortened "θ" sound of said "θ" symbol, and said consonant phonetic symbols comprising a "b" symbol representing a "b" sound in a word "boy", a "p" symbol representing a "p" sound in a word "pay", an "m" symbol representing an "m" sound in a word "may", an "f" symbol representing an "f" sound in a word "fan", a "d" symbol representing a "d" sound in a word "day", a "t" symbol representing a "t" sound in a word "toy", an "n" symbol representing an "n" sound in a word "no", an "l" symbol representing an "l" sound in a word "long", a "g" symbol representing a "g" sound in a word "go", a "k" symbol representing a "k" sound in a word "kind", an "h" symbol representing an "h" sound in a word "hide", a "j" symbol representing a "j" sound in a word "jeep", a "q" symbol representing a first predetermined consonant sound of a word "漆" (translated as "paint"), an "x" symbol representing a second predetermined consonant sound of a word "西" (translated as "west"), a "tz''" symbol representing a third predetermined consonant sound of a word "紮" (translated as "tighten"), a "tc''" symbol representing a fourth predetermined consonant sound of a word "叉" (translated as "fork"), an "s''" symbol representing a fifth predetermined consonant sound of a word "沙" (translated as "sand"), an "rr" symbol representing a sixth predetermined consonant sound of a word "嚷" (translated as "shout"), a "tz" symbol representing a seventh predetermined consonant sound of a word "資" (translated as "capital"), a "tc" symbol representing an eighth predetermined consonant sound of a word "擦" (translated as "scrub"), an "s" symbol representing a ninth predetermined consonant sound of a word "撒" (translated as "spread"), a "y" symbol representing a tenth predetermined consonant sound of a word "鴨" (translated as "duck"), a "w" symbol representing an eleventh predetermined consonant sound of a word "挖" (translated as "dig"), and a "yii" symbol representing a twelfth predetermined consonant sound of a word "迂" (translated as "curve").

3. The method, as recited in claim 2, wherein said phonetic diagram further comprises a vowel symbol diagram and a consonant symbol diagram.

4. The method, as recited in claim 3, wherein said vowel symbol diagram comprises a circle, wherein said "a" symbol, said "ee" symbol, said "oo" symbol, said "ae" symbol and said "o" symbol are listed along an upper outer periphery of said circle, said "â" symbol, said "î" symbol, said "û" symbol, said "ê" symbol and said "ô" symbol are listed along a lower outer periphery of said circle, said "ii" symbol and said "θ" symbol are listed inside an upper portion of said circle, and said "îî" symbol and said "θ̂" symbol are listed inside a lower portion of said circle.

5. The method, as recited in claim 2, wherein a usage of said "tz''" symbol, said "tc''" symbol, said "s''" symbol, said "rr" symbol, said "tz" symbol, and said "tc" symbol of said consonant phonetic symbols are equivalent to Guoyu Zhuyin symbols "ㄓ", "ㄔ", "ㄕ", "ㄖ", "ㄗ", and "ㄘ" respectively.

6. The method, as recited in claim 2, wherein a "." symbol is added to a lower right hand corner of each of said "tz''" symbol, said "tc''" symbol, said "s''" symbol, said "rr" symbol, said "tz" symbol, said "tc" symbol and said "s" symbol to form a "tz.''" symbol, a "tc.''" symbol, an "s.''" symbol, an "rr." symbol, a "tz." symbol, a "tc." symbol and an "s." symbol respectively to represent a sound of Chinese characters "之" (translated as "of"), "吃" (translated as "eat"), 詩(translated as "poem"), "日" (translated as "day") (first tone), "姿" (translated as "beauty"), "疵" (translated as "flaws"), and "思" (translated as "think") respectively.

* * * * *